(12) United States Patent
Kluver et al.

(10) Patent No.: US 9,984,396 B2
(45) Date of Patent: May 29, 2018

(54) METHOD AND SYSTEM FOR CUSTOMER CHECKOUT

(71) Applicant: Walmart Stores, Inc., Bentonville, AR (US)

(72) Inventors: Jared Kluver, Bentonville, AR (US); Jason Todd, Bentonville, AR (US); Rebecca Sue Schmalbeck, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 411 days.

(21) Appl. No.: 14/811,032

(22) Filed: Jul. 28, 2015

(65) Prior Publication Data

US 2016/0034981 A1 Feb. 4, 2016

Related U.S. Application Data

(60) Provisional application No. 62/031,364, filed on Jul. 31, 2014.

(51) Int. Cl.
G06Q 30/02 (2012.01)
G06Q 20/20 (2012.01)
G06Q 30/06 (2012.01)

(52) U.S. Cl.
CPC ....... *G06Q 30/0281* (2013.01); *G06Q 20/202* (2013.01); *G06Q 30/0607* (2013.01); *G06Q 30/0633* (2013.01)

(58) Field of Classification Search
None
See application file for complete search history.

(56) References Cited

U.S. PATENT DOCUMENTS 7,866,546 B1 1/2011 Vance
2008/0290182 A1* 11/2008 Bell ................ G06Q 10/04
235/61 V (Continued)

FOREIGN PATENT DOCUMENTS

CA 2620620 3/2007
CN 103177362 6/2013

(Continued)

OTHER PUBLICATIONS

"The Great Mind Challenge: Customer Mobile Application for Retail—Receipt Manager", TechGeniusSolutions.com, first accessed Apr. 12, 13, 2014, most recently accessed on Jul. 10, 2015; 2 pages.

(Continued)

*Primary Examiner* — Florian M Zeender
*Assistant Examiner* — Denisse Y Ortiz Roman
(74) *Attorney, Agent, or Firm* — Schmeiser, Olsen & Watts

(57) ABSTRACT

Disclosed is a system and method for directing a customer to one of a plurality of checkout lanes in a retail store. The system includes a checkout lane selection module that is in communication with each of the plurality of checkout lanes. The checkout lane selection module is part of a computing device, such as a server, that may be resident in the retail store, or remote from the retail store. The checkout lane selection module receives lane status information from each of the plurality of checkout lanes. And the checkout lane selection module receives customer information from a customer profile and from the customer's shopping basket. The checkout lane selection module provides the customer a preferred lane selection, and/or details about each checkout lane so that the customer can make an informed choice about which checkout lane to use.

10 Claims, 3 Drawing Sheets

(56) References Cited

U.S. PATENT DOCUMENTS

2009/0094100 A1    4/2009   Xavier
2013/0175339 A1    7/2013   Svetal
2015/0278799 A1*   10/2015   Palanisamy .......... G06Q 20/363
                                                                 705/76

FOREIGN PATENT DOCUMENTS

CN        103366191     10/2013
GB          2307575      5/1997
WO       2009006398      1/2009

OTHER PUBLICATIONS

"In-Store Technology: Delivering the Shopping Experience Customers Want", iQmetrix.com, first accessed Apr. 12, 13, 2014, most recently accessed on Jul. 10, 2015; 18 pages.
"IBM Self-Checkout System Overview", IBM.com, 2004, 2005, accessed on Jul. 10, 2015; 54 pages.

\* cited by examiner

METHOD AND SYSTEM FOR CUSTOMER CHECKOUT

CROSS-REFERENCE TO RELATED APPLICATION

This application claims priority to U.S. Patent Application No. 62/031,364, filed Jul. 31, 2014 entitled "Method and System for Customer Checkout", which is incorporated entirely herein by reference.

BACKGROUND

Technical Field

This disclosure relates to customer checkout systems in retail stores, and specifically to a system and method of providing information to assist a customer in selecting which checkout lane to choose.

State of the Art

Customers in stores typically pay for their purchases at cash registers. Such registers, at least in large stores, are often arranged in rows of checkout lanes along the front end of the store. Each register may be associated with a register or lane number that is often shown on an illuminated placard above the register, alerting customers to which checkout lanes are open or registers are in use.

Customers often have limited information to use in selecting which checkout lane to use. Typically, a customer may only have a rough idea of how long a wait for a particular register is, based on the line of customers in that lane. Accordingly, the customer can, at best, make a decision based on relative line lengths and the speed at which customers are progressing through the lanes. There is a range of additional information a customer could find useful in selecting a checkout lane.

Accordingly, there is a need for a system and/or method to notify customers of cash register lane restrictions. There is a further need for a system and/or method to facilitate recommendations regarding lane selection to customers when they are ready to checkout. What is needed is a checkout system which provides information that assists a customer in choosing a checkout lane at a retail store.

DETAILED DESCRIPTION OF EMBODIMENTS OF THE INVENTION

Figure 1:
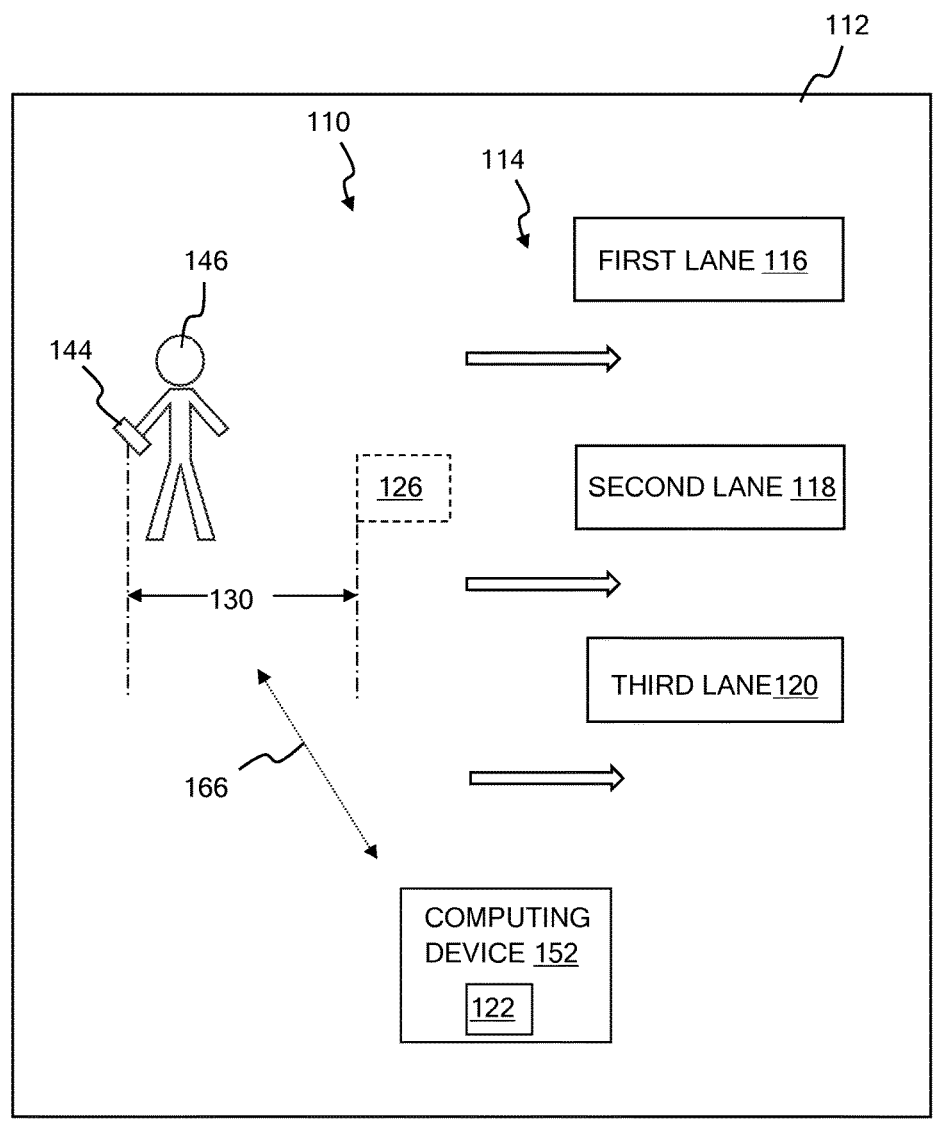
FIG. 1 shows a simplified drawing of a system for customer checkout in a retail store.

A system and method for directing a customer to one of a plurality of checkout lanes in a retail store is disclosed. The system includes a checkout lane selection module that is in communication with each of the plurality of checkout lanes. The checkout lane selection module is part of a computing device, such as a server, that may be resident in the retail store, or remote from the retail store. The checkout lane selection module receives lane status information from each of the plurality of checkout lanes. And the checkout lane selection module receives customer information from a customer profile and from the customer's shopping basket. The checkout lane selection module provides the customer a preferred lane selection, and/or details about each checkout lane so the customer can make an informed choice about which checkout lane to select for use. The checkout lane selection module used the lane status information and the customer information to determine the preferred lane selection and lane selection details.

Customers often have limited information to use in selecting which checkout lane to use. Typically, a customer may only have a rough idea of how long a wait for a particular register is, based on the line of customers in that lane. Accordingly, the customer can, at best, make a decision based on relative line lengths and the speed at which customers are progressing through the lanes. There is a range of additional information a customer could find useful in selecting a checkout lane.

For example, information regarding the cashier in attendance at each checkout lane can be useful to the customer. If a customer wishes to purchase a regulated product such as alcohol, tobacco, spray paint, and the like, regulations may require a cashier above a minimum age to sell those products. Selecting a line with an under-aged cashier may delay the checkout process as a manager or other employee will need to be called to the register to complete the sale. In some situations, a customer may complete checkout faster by selecting a lane with a cashier old enough to sell the product even if that lane has a line that is longer than that of another lane. Other information which may be useful about a cashier includes whether or not a cashier is logged into the register, when the cashier logged into the register has a scheduled break or end of shift, and information regarding the cashier's ability to accept certain forms of tender or sell one or more regulated items. Whether or not the cashier has received training to process transactions with certain types of tender such as supplemental nutrition assistance program vouchers (food stamps), women, infant and children (WIC) benefits, electronic banking transaction (EBT) cards, smart cards or other types of tender is also useful information. In some situations, historical and/or real-time statistics about the cashier including how fast the cashier is scanning items and/or clearing transactions can be used in a determination of which lane to select.

It may also be useful to the customer to know specifics about the register equipment available at each checkout lane. Exemplary equipment could include a cash drawer, a card reader for magnetic strip cards, a chip-and-pin reader for smart-card chip reading, a working optical scanner, a working grocery scale, or other equipment used in retail transactions.

In use, a customer may be shopping with a mobile computing device (personal electronic device), and may have a customer profile stored by the device in a data base. Information about the customer from their current store visit and from their customer profile is used by the checkout lane selection module to choose a preferred lane. Customer information relating to the current shopping trip can be captured by the personal electronic device (also referred to as a mobile computing device, a smart phone, etc). One or more of a global positioning system (GPS), a cellular network location data, or a wi-fi network may be used to determine if the customer is in a particular retail store, and even which entrance the customer used when entering the store. Alternatively, the retail store may have one or more location detection devices which can detect the presence of the customer's mobile computing device in the retail store.

If the customer is using a mobile application on their mobile computing device that is affiliated with the retail store, this application may check items off of a virtual shopping list, or scan items as they are selected. The application may be configured to communicate directly, or indirectly, with the checkout lane selection module.

The checkout lane selection module computes and reports to the customer a recommendation for a checkout lane, based on database information about the register lanes, cashiers, and customer data available via the application. In some situations the checkout lane selection module transmits detailed lane selection data to the customer so that the customer can make an educated choice of checkout lanes.

Based upon the presence of a regulated item in the customer's shopping basket (having been scanned or entered into the customer's mobile computing device), the checkout lane selection module may eliminate those register lanes staffed by underage cashiers as possible recommendations. The customer may also have the ability to select tender types the customer commonly use or has set as a default in the user setting portion of their customer profile. If a particular type of tender is commonly used by the customer, then only register lanes capable of accepting such tender will be included as possible checkout lane selections. Alternatively, if a limited number of lanes are available, then a push notification may be used to ask the customer if they will be paying with a type of tender only acceptable at a subset of the lanes. Should no lanes be open that can accept the tender type, or are staffed by an appropriate cashier, an alert may be sent to a store manager or other employee that another checkout lane should be opened and by which on-duty cashier. Self-checkout lanes may also be recommended, if available, based on a customer's preference and availability.

The checkout lane selection system may provide an alert or message to the customer with one or more preferred lane selections. The recommendation may be triggered by one or more triggering events. These triggering events may include an input from the customer indicating that the customer is ready to checkout, the checking off or scanning of the last item on a list, or the presence of the customer at the checkout area near the front of the store. In response to a triggering event, the checkout lane selection module provides a preferred lane selection and/or a list of preferred lane selection data.

The preferred lane selection may be determined at least partly by process of elimination. In such embodiments, an initial list of all lanes may be reduced by eliminating lanes that are not open, which are not staffed by cashiers trained to accept a type of tender used by the customer, and/or which are staffed by a cashier too young to complete the sale of a regulated product believed to be in the customer's shopping basket. The resulting sub-list of register lanes may be ordered by the customer's or store's preference for self-checkout. The list may also be ordered to position the customer closer to the entrance used by the customer when arriving at the store.

In some embodiments, the system may be used to facilitate spontaneous purchases. This can be done by looking to the customer's purchase history and routing the customer to a checkout lane having products previously purchased by the customer. The system and method may also be advantageously used in conjunction with other data collection to enhance the customer shopping experience.

Figure 2:
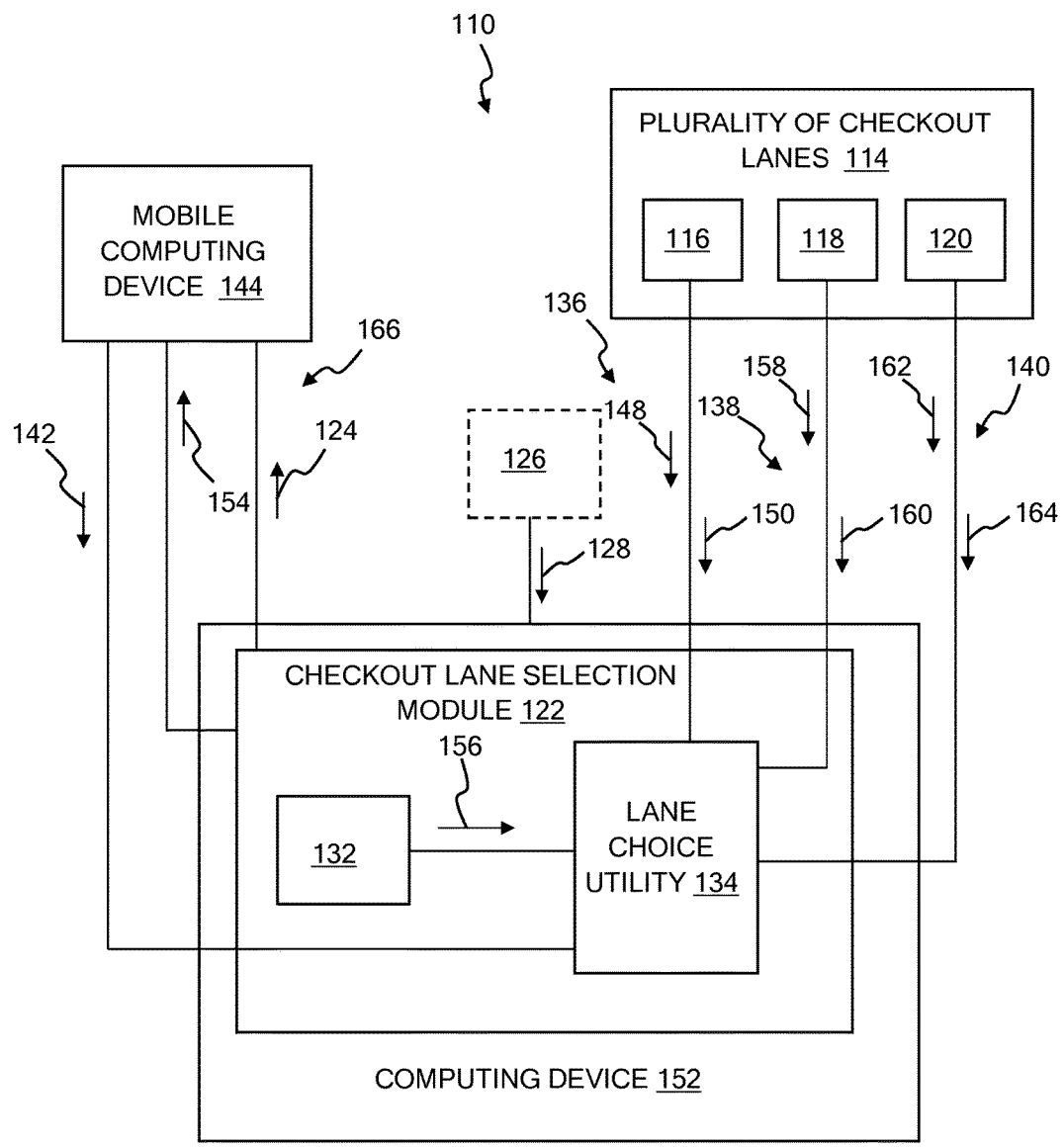
FIG. 2 shows a simplified block diagram of a system for customer checkout in a retail store.

FIG. 1 and FIG. 2 show a system for customer checkout 110. FIG. 1 shows a simplified diagram of customer checkout system 110 in a retail store 112. FIG. 2 shows a simplified block diagram of system for customer checkout 110 of FIG. 1. System 110 can be used in any retail store or establishment that includes a plurality of checkout lanes or registers for accepting payment. Checkout lanes or registers may be referred to by other terms, but they generally refer to the location and/or hardware that a customer brings their purchases to when they are finished shopping and they wish to pay for their purchases and leave the retail store. In the embodiment shown in FIG. 1, system for customer checkout 110 is resident in retail store 112, which includes a plurality of checkout lanes 114. Plurality of checkout lanes 114 includes a first checkout lane 116, a second checkout lane 118, and a third lane 120. System for customer checkout 110 is used in retail stores with more than one checkout lane, because if there is only one checkout lane, then the customer does not have to make a selection as to which checkout lane to use.

System for customer checkout 110 includes a checkout lane selection module 122, which in this embodiment is resident on a computing device 152. In this embodiment, computing device 152 is a server resident in retail store 112, but this is not meant to be limiting. Checkout lane selection module 122 can be resident on any type of computing or electronic device, and can be located anywhere as long as it can be communicatively coupled to plurality of checkout lanes 114.

Plurality of checkout lanes 114 are communicatively coupled to checkout lane selection module 122, as shown in FIG. 2. Checkout lane selection module 122 is communicatively coupled to a mobile computing device 144 carried by a customer 146, as shown in FIG. 1 and FIG. 2. This communication between checkout lane selection module 122 and mobile computing device 144 is labeled as communication 166. Communication 166 includes a shopping basket list 142 (FIG. 2), which is communicated from mobile computing device 144 to checkout lane selection module 122. Communication 166 also includes preferred lane checkout information 124 (FIG. 2), and a preferred lane selection 154, which are communicated from checkout lane selection module 122 to mobile computing device 144, and which are discussed in more detail below.

Communication 166, in this embodiment, is wireless communication and occurs whenever mobile computing device 144 is within wireless range of checkout lane selection module 122. In some embodiments, checkout lane selection module 122 is remotely located, and coupled to a transmitter/receiver in retail store 112 that handles communication 166. Checkout lane selection module 122 is configured to communicate with mobile computing device 144 only when customer 146 and mobile computing device 144 are in or near retail store 112. In some embodiments, communication 166 is wired communication, which can be implemented by customer 146 coupling mobile computing device 144 to a connector when in retail store 112, for example.

Checkout lane selection module 112 outputs preferred lane checkout information 124 and preferred lane selection 154 (FIG. 2) in response to receiving lane status information 136, 138, and 140 (FIG. 2) from plurality of checkout lanes 114. Checkout lane selection module 112 is communicatively coupled to each of plurality of checkout lanes 114, and receives lane status information 136, 138, and 140 from each of plurality of checkout lanes 114, as shown in FIG. 2. In this embodiment, checkout lane selection module 122 receives lane status information 136 from first checkout lane 116. Checkout lane selection module 122 receives lane status information 138 from second checkout lane 118, and lane status information 140 from third checkout lane 120.

Lane status information 136, 138, and 140 includes information about both the register hardware and capabilities at each checkout lane 116, 118, or 120, and the characteristics and capabilities of the cashier at each checkout lane 116, 118, or 120. Lane status information 136 includes register capabilities 148 and cashier characteristics 150 associated with first checkout lane 116, as shown in FIG. 2. Register capabilities 148 includes many types of information about the register and other hardware capabilities of first checkout lane 116, which can include one or more of whether the register of checkout lane 116 is open, if checkout lane 116 includes a grocery scale, if the register of checkout lane 116 has a debit or credit card scanner, or if checkout lane 116 has a working product scanner. Other examples of information that can be included in register capabilities 148 are whether the equipment of checkout lane 116 includes a cash drawer, a card reader for magnetic strip cards, a chip-and-pin reader for smart-card chip reading, a working optical scanner, a working grocery scale, or other equipment used in retail transactions. Register capabilities 148 can include any of this information or other information that can be useful to customer 146 in selecting a checkout lane.

Cashier characteristics 150 includes many types of information about the cashier associated with first checkout lane 116. Cashier characteristics 150 can include one or more of whether the cashier is over the minimum age to sell tobacco products, or whether the cashier is over the minimum age to sell alcohol products or other regulated products. In some embodiments, cashier characteristics 150 includes one or more of characteristics such as whether or not a cashier is logged into the register, when the cashier logged into the register has a scheduled break or end of shift, or information regarding the cashier's ability to accept certain forms of tender. In some embodiments, cashier characteristics 150 includes one or more of whether or not the cashier has received training to process transactions with certain types of tender such as supplemental nutrition assistance program vouchers (food stamps), women infant and children (WIC) benefits, electronic banking transaction (EBT) cards, smart cards, other government subsidy payment types, or other types of tender. In some embodiments, cashier characteristics 150 includes historical and/or real-time statistics about the cashier including how fast the cashier is scanning items and/or clearing transactions.

Checkout lane selection module 122 uses register capabilities 148 and cashier characteristics 150 to determine preferred lane selection 154 and preferred checkout lane information 124, which are both sent to mobile computing device 144. In some embodiments, checkout lane selection module 122 outputs one of preferred lane selection 154 or preferred checkout lane information 124 in response to receiving register capabilities 148 from first checkout lane 116. In some embodiments, checkout lane selection module 122 outputs one of preferred lane selection 154 or preferred checkout lane information 124 in response to receiving cashier characteristics 150 from first checkout lane 116.

Lane status information 138 includes register capabilities 158, and cashier characteristics 160 associated with second checkout lane 118, as shown in FIG. 2. Register capabilities 158 includes many types of information about the register and other hardware capabilities of second checkout lane 118, which can include one or more of whether the register of checkout lane 118 is open, if checkout lane 118 includes a grocery scale, if the register of checkout lane 118 has a debit or credit card scanner, or if checkout lane 118 has a working product scanner. Register capabilities 158 can include all of the types of information described for register capabilities 148, except register capabilities 158 describes and is associated with the register and hardware of second checkout lane 118.

Cashier characteristics 160 includes many types of information about the cashier associated with second checkout lane 118. Cashier characteristics 160 can include one or more of whether the cashier of second checkout lane 118 is over the minimum age to sell tobacco products, or whether the cashier is over the minimum age to sell alcohol products or other regulated products. In some embodiments, cashier characteristics 160 includes one or more of characteristics such as whether or not the cashier associated with second checkout lane 118 is logged into the register, when the cashier logged into the register has a scheduled break or end of shift, or information regarding the cashier's ability to accept certain forms of tender. In some embodiments, cashier characteristics 160 includes one or more of whether or not the cashier associated with second checkout lane 118 has received training to process transactions with certain types of tender. Cashier characteristics 160 can include any of the types of information described above for cashier characteristics 150, except that cashier characteristics 158 describe the cashier associated with second checkout lane 118.

Checkout lane selection module 122 uses register capabilities 158 and cashier characteristics 160 to determine preferred lane selection 154 and preferred checkout lane information 124, which are both sent to mobile computing device 144. In some embodiments, checkout lane selection module 122 outputs one of preferred lane selection 154 or preferred checkout lane information 124 in response to receiving register capabilities 158 from second checkout lane 118. In some embodiments, checkout lane selection module 122 outputs one of preferred lane selection 154 or preferred checkout lane information 124 in response to receiving cashier characteristics 160 from second checkout lane 118.

Lane status information 140 includes register capabilities 162, and cashier characteristics 164 associated with third checkout lane 120, as shown in FIG. 2. Register capabilities 162 can include all of the types of information described above for register capabilities 148 or 158, except register capabilities 162 describes and is associated with the register and hardware of third checkout lane 120.

Cashier characteristics 164 includes many types of information about the cashier associated with third checkout lane 120. Cashier characteristics 164 can include any of the types of information described above for cashier characteristics 150 or 160, except that cashier characteristics 164 describe the cashier associated with third checkout lane 120.

Checkout lane selection module 122 uses register capabilities 162 and cashier characteristics 164 to determine preferred lane selection 154 and preferred checkout lane information 124, which are both sent to mobile computing device 144. In some embodiments, checkout lane selection module 122 outputs one of preferred lane selection 154 or preferred checkout lane information 124 in response to receiving register capabilities 162 from third checkout lane 120. In some embodiments, checkout lane selection module 122 outputs one of preferred lane selection 154 or preferred checkout lane information 124 in response to receiving cashier characteristics 164 from third checkout lane 120.

In some embodiments, plurality of checkout lanes 114 includes additional checkout lanes, which send their register capabilities and/or cashier characteristics to checkout lane selection module 122.

Also useful in selecting a checkout lane is customer information. Mobile computing device 144 in the embodiment shown in FIG. 1 and FIG. 2 sends customer shopping basket 142 to checkout lane selection module 122. Shopping basket 142 includes a list of the items that will be purchased by customer 146 at one of plurality of checkout lanes 114. In some embodiments, checkout lane selection module 122 outputs preferred lane selection 154 in response to receiving lane status information 136, 138, or 140 from checkout lanes 116, 118, or 120, and customer shopping basket 142 from mobile computing device 144. In some embodiments, checkout lane selection module 122 outputs preferred checkout lane information 124 in response to receiving lane status information 136, 138, or 140 from checkout lanes 116, 118, or 120, and customer shopping basket 142 from mobile computing device 144.

Checkout lane selection module 122 includes a customer profile database 132. Customer profile database 132 is stored in memory on computing device 152, and includes information on customer 146. It is to be understood that each customer of retail store 112 will have a customer profile database associated with themselves, which will include information regarding and associated with the customer. Customer profile database 132 can include a preferred method of payment, for example. Customer profile database 132 can include the customer shopping history, or any other shopping preferences which may influence a selection of checkout lanes. In some embodiments, checkout lane selection module 122 outputs preferred lane selection 154 in response to receiving lane status information 136, 138, or 140 from checkout lanes 116, 118, or 120, and customer information 156 (FIG. 2) from customer profile database 132. In some embodiments, checkout lane selection module 122 outputs preferred checkout lane information 124 in response to receiving lane status information 136, 138, or 140 from checkout lanes 116, 118, or 120, and customer information 156 (FIG. 2) from customer profile database 132.

Checkout lane selection module 122 in this embodiment includes a lane choice utility 134, and customer profile database 132 communicatively coupled to lane choice utility 134. Lane choice utility 134 in this embodiment receives and processes lane status info 136, 138, and 140, customer shopping basket 142 from mobile computing device 144, and customer information 156 from customer profile database 132. Lane choice utility 134 outputs preferred checkout lane information 124, and preferred lane selection 154 in response to receiving lane status info 136, 138, and 140, customer shopping basket 142 from mobile computing device 144, and customer information 156 from customer profile database 132. Checkout lane selection module 122 outputs preferred checkout lane information 124, and preferred lane selection 154 to mobile computing device 144 in response to receiving preferred checkout lane information 124, and preferred lane selection 154 from lane choice utility 134.

As discussed earlier, communication 166 occurs when mobile computing device 144 carried by customer 146 is in or near retail store 112. In some embodiments, customer 146 informs checkout lane selection module 122 they are near by sending a text or other communication to checkout lane selection module 122. In some embodiments, system for customer checkout 110 includes one or more location detection device 126 (shown in dotted lines in FIG. 1 and FIG. 2 to illustrate optional element). Location detection device 126 is configured to detect when mobile computing device 144 is within a predetermined distance 130 from one of plurality of checkout lanes 114.

Communication 166 can include preferred checkout lane information 124. Preferred checkout lane information 124 is sent to mobile computing device 144 by checkout lane selection module 122 as part of communication 166. Preferred checkout lane information 124 includes the details of each of plurality of checkout lanes 114, so that customer 146 can review preferred checkout lane information 124 and make an informed choice of which checkout lane to select. Preferred checkout lane information 124 can include any of the information regarding the register, hardware, or cashier associated with each of plurality of checkout lanes 114 that is provided by lane status information 136, 138, or 140.

Communication 166 can include preferred lane selection 154. Preferred lane selection 154 is a recommendation of which checkout lane 116, 118, or 120 is recommended by checkout lane selection module 122 for customer 146 to use. Preferred lane selection 154 is sent to mobile computing device 144 by checkout lane selection module 122 as part of communication 166. In some embodiments, checkout lane selection module 122 and/or lane choice utility 134 use lane status information 136, 138, and 140 to determine preferred lane selection 154. In some embodiments, checkout lane selection module 122 and/or lane choice utility 134 use lane status information 136, 138, and 140 and customer shopping basket 142 to determine preferred lane selection 154. In some embodiments, checkout lane selection module 122 and/or lane choice utility 134 use lane status information 136, 138, and 140, customer shopping basket 142, and customer information 156 to determine preferred lane selection 154.

In embodiments where location detection device 126 is used, location detection device 126 is communicatively coupled to checkout lane selection module 122, and sends checkout lane selection module 122 a customer nearby indicator 128 when location detection device 126 detects that customer device 144 is within a predetermined distance 130 from one of plurality of checkout lanes 114. Location detection device 126 can be positioned anywhere near one or more of plurality of checkout lanes 114, and will notify checkout lane selection module 122 that customer 146 is nearby and that checkout lane selection module 122 should initiate communication 166. Location detection device 126 can use any method known now or in the future to detect the presence of mobile computing device 144, or customer 146.

Figure 3:
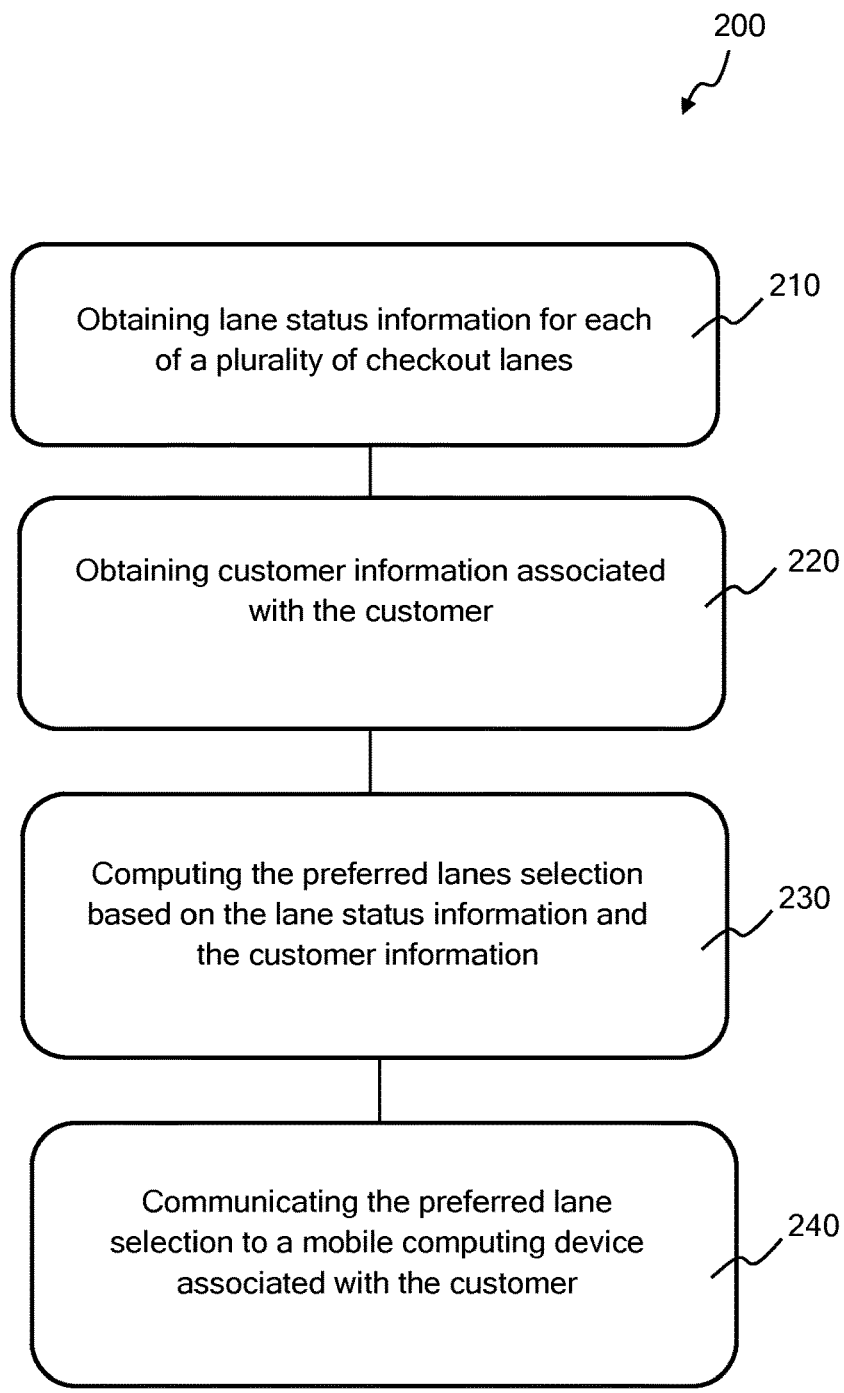
FIG. 3 illustrates a method of providing a preferred lane selection to a customer of a retail store.

FIG. 3 illustrates a method 200 of providing a preferred lane selection to a customer of a retail store. The preferred lane selection indicates which checkout lane of a plurality of checkout lanes is best suited for the customer to use for checkout out of the retail store. Method 200 includes an act 210 of obtaining lane status information for each of a plurality of checkout lanes. Method 200 of providing a preferred lane selection to the customer also includes an act 220 of obtaining customer information associated with the customer. Method 200 includes an act 230 of computing the preferred lane selection based on the lane status information and the customer information. Method 200 also includes an act 240 of communicating the preferred lane selection to a mobile computing device associated with the customer. Method 200 can include many other acts. In some embodiments, method 200 includes receiving a customer shopping basket associated with the customer. In some embodiments, act 240 of communicating the preferred lane selection to a mobile computing device associated with the customer occurs in response to receiving the lane status information, the customer information, and the customer shopping basket.

In some embodiments, act 210 of obtaining the lane status information includes determining the capability of a register, where the register is associated with one of the plurality of checkout lanes. In some embodiments, act 210 of obtaining the lane status information includes determining the capability of a plurality of registers, where each of the plurality of registers is associated with one of the plurality of checkout lanes. In some embodiments, determining the capability of a register includes determining one of: if the register comprises a grocery scale, if the register has a debit card scanner, and if the register has a working product scanner. In some embodiments, determining the capability of a register includes determining one or more of whether the register of a checkout lane is open, if a checkout lane includes a grocery scale, if the register of a checkout lane has a debit or credit card scanner, or if a checkout lane has a working product scanner. In some embodiments, determining the capability of a register includes determining whether the equipment of a checkout lane includes a cash drawer, a card reader for magnetic strip cards, a chip-and-pin reader for smart-card chip reading, a working optical scanner, a working grocery scale, or other equipment used in retail transactions.

In some embodiments, act 210 of obtaining the lane status information includes determining the characteristics of a cashier, where the cashier is associated with the one of the plurality of checkout lanes. In some embodiments, act 210 of obtaining the lane status information includes determining the capability of a plurality of cashiers, where each of the plurality of cashiers is associated with one of the plurality of checkout lanes. Determining the capability of a cashier can include determining whether the cashier is over the minimum age to sell tobacco products, or whether the cashier is over the minimum age to sell alcohol products or other regulated products. Determining the capability of a cashier can include determining whether or not a cashier is logged into the register, when the cashier logged into the register has a scheduled break or end of shift, or information regarding the cashier's ability to accept certain forms of tender. Determining the capability of a cashier can include determining whether or not the cashier has received training to process transactions with certain types of tender such as supplemental nutrition assistance program vouchers (food stamps), women infant and children (WIC) benefits, electronic banking transaction (EBT) cards, smart cards, other government subsidy payment types, or other types of tender. Determining the capability of a cashier can include determining historical and/or real-time statistics about the cashier including how fast the cashier is scanning items and/or clearing transactions.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description herein is for the purpose of describing particular embodiments only and is not intended to be limiting of the invention. As used in the description of the embodiments and the appended claims, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

The invention claimed is:

1. A system for customer checkout from a retail store comprising:
   a first checkout register resident in the retail store, wherein the first checkout register outputs a first register capabilities and a first cashier characteristics, and wherein the first register capabilities comprises: whether the first checkout register has a grocery scale, whether the first checkout register has a debit card scanner, and whether the first checkout register has a cash drawer;
   a second checkout register resident in the retail store, wherein the second checkout register outputs a second register capabilities and a second cashier characteristics, and wherein the second register capabilities comprises: whether the second checkout register has a credit card scanner, whether the second checkout register has a working product scanner, and whether the second checkout register has a grocery scale;
   a mobile computing device carried by a customer in the retail store;
   a checkout lane selection module communicatively coupled to the first and the second checkout registers and communicatively coupled to the mobile computing device; and
   a location detection device communicatively coupled to the checkout lane selection module, wherein the location detection device sends a customer nearby indicator to the checkout lane selection module in response to detecting that the mobile computing device is within a predetermined distance from the location detection device;
   wherein the checkout lane selection module communicates preferred checkout lane information comprising the first and the second register characteristics and the first and the second cashier characteristics to the mobile computing device in response to receiving the first and the second register characteristics, the first and the second cashier characteristics, and the customer nearby indicator.

2. The system of claim 1, wherein the checkout lane selection module comprises a customer profile communicatively coupled to a lane choice utility.

3. The system of claim 2, wherein the lane choice utility receives lane status information from each of the first and the second checkout registers.

4. The system of claim 3, wherein the lane choice utility receives a shopping basket list from the mobile computing device.

5. A retail store checkout system comprising:
   a first checkout register resident in the retail store, wherein the first checkout register outputs a first lane status information, wherein the first lane status information comprises a first register capabilities and a first cashier characteristics, and wherein the first register capabilities comprises: whether the first checkout register has a grocery scale, whether the first checkout register has a debit card scanner, and whether the first checkout register has a cash drawer;
   a second checkout register resident in the retail store, wherein the second checkout register outputs a second lane status information, wherein the second lane status information comprises a second register capabilities and a second cashier characteristics, and wherein the second register capabilities comprises: whether the second checkout register has a credit card scanner, whether the second checkout register has a working product scanner, and whether the second checkout register has a grocery scale;
   a checkout lane selection module communicatively coupled to the first and the second checkout register;
   a mobile computing device communicatively coupled to the checkout lane selection module;
   a location detection device communicatively coupled to the checkout lane selection module, wherein the location detection device sends a customer nearby indicator to the checkout lane selection module in response to detecting that the mobile computing device is within a predetermined distance from the location detection device;
   wherein the checkout lane selection module sends a preferred lane checkout information and a preferred lane selection to the mobile computing device in response to receiving:
      the first and the second lane status information from the first and the second checkout registers;
      the customer nearby indicator from the location detection device; and
      a customer shopping basket information associated with a customer from the mobile computing device.

6. The retail store checkout system of claim 5, wherein the checkout lane selection module uses the first and the second lane status information and the customer shopping basket information to determine the preferred lane selection.

7. The retail store checkout system of claim 6, wherein the checkout lane selection module further uses customer information from a customer profile database to determine the preferred lane selection, wherein the customer profile database is stored on the computing device, and wherein the customer information is associated with the customer.

8. The retail store checkout system of claim 7, wherein the customer information includes a preferred method of payment.

9. The retail store checkout system of claim 5, wherein the first cashier characteristics includes a characteristics of a cashier associated with the first register.

10. The retail store checkout system of claim 9, wherein the characteristics of the cashier include whether or not the cashier is over the minimum age to sell tobacco products.

* * * * *